8786X
E. Ingals.
Fire-Place.
Patented Apr. 22, 1835.
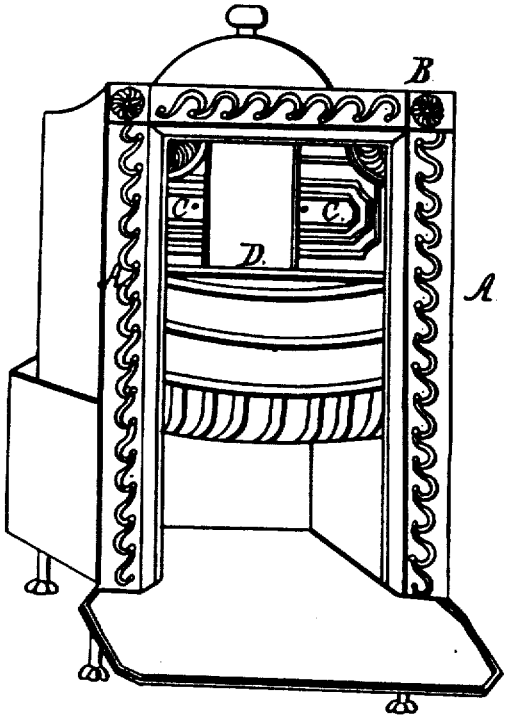

87860X    Apl, 22, 1835    34

Elkanah Ingalls

The schedule referred to in these Letters Patent and making part of the same, containing a description in the words of the said Elkanah Ingalls, himself of his improvement in Stoves and Grates for Parlor & Kitchen use.

---

Be it known and remembered that I Elkanah Ingalls of Providence, in the County of Providence, and State of Rhode Island &c. have invented a new and useful improvement in Stoves and Grates for Parlor and Kitchen use, which may be thus specified and described.

In open Stoves generally, the space between the top of the grate and the lower edge of the upper part of the front or top, of the Stove, or some part of it, is closed by a door, composed of two parts, one of which is hung to each of the upright parts of the front, by a hinge and hook. The object of the improvement is to close the same space, with a door sliding horizontally & made of any suitable material.

The drawing annexed represents an open Stove. A.A. are the upright parts and B, the upper part, of the front. C, C. represent the improved door in two parts, one open and the other closed. D. is a lip projecting inward from the inside of the top bar of the grate, with a groove in it, this extends not only the length of the grate but to near the outer edge of each of the uprights A.A. The doors cc. stand in this groove, and are moved in it horizontally to the right and left, when opened or closed. The upright parts A.A. where the doors are, are made at least half as wide as the length of the grate. They may be made of the same width throughout. Behind each of them on the inside, is an opening over the lip D. large enough to receive the door when it is opened, and behind which, it is then entirely concealed. In the drawing the lip D. is represented on the inside & at the top of the grate; it can as easily & as conveniently be placed either below or above the top of the grate, or on the outside of it or a lip to answer the same purpose, may be made on B the upper part of the front, on which the door will rest by a lip on the upper end of it, and on which it will be moved instead of the lip at 42. 8786X the bottom of the door. This lip can be placed on the inside or outside of B. In case it be desirable to diminish the width of the uprights A.A. and still have the doors concealed behind them when opened, that can be accomplished by making the door in more parts, & having one part slip past another. The use of this improvement is not confined to Stoves. It may be applied to grates set in a chimney for parlor and kitchen use. In such cases, the doors may be concealed by passing behind the work at the ends of the grate, or they can pass on the outside of that work, as fancy or convenience may direct.

The advantages of this improvement are, less expense in construction, greater neatness in appearance, and less liability to get out of repair.

I claim as my invention the application of horizontally sliding doors, to Stoves and grates of all descriptions.

Providence March 28. 1835.

Witnesses
Nathaniel Searle
William R. Staples }

Elkanah Ingalls (Drawing)

[572 wds]

[[illegible]]

Recd. & Recorded [illegible] Apl. 24. 1837. —

14
13
26
13
12
64
57